United States Patent [19]

Baillargeon et al.

[11] Patent Number: 5,266,084
[45] Date of Patent: Nov. 30, 1993

[54] OLIGOMERIC/POLYMERIC MULTIFUNCTIONAL ADDITIVES TO IMPROVE THE LOW-TEMPERATURE PROPERTIES OF DISTILLATE FUELS

[75] Inventors: David J. Baillargeon, Cherry Hill; Angeline B. Cardis, Florence; Dale B. Heck, West Deptford, all of N.J.; Susan W. Johnson, Centreville, Va.

[73] Assignee: Mobil Oil Corporation, Fairfax, Va.

[21] Appl. No.: 946,221

[22] Filed: Sep. 17, 1992

[51] Int. Cl.$^5$ .......................... C10L 1/18; C08L 67/02
[52] U.S. Cl. ........................................ 44/393; 44/385; 44/386; 44/391; 525/25; 525/28; 525/31
[58] Field of Search ................................... 44/386, 393

[56] References Cited

U.S. PATENT DOCUMENTS 5,002,588  3/1991  Baillargeon et al. ................. 44/331
5,039,306  8/1991  Baillargeon et al. ................. 44/331

Primary Examiner—Ellen M. McAvoy
Attorney, Agent, or Firm—Alexander J. McKillop; Malcolm D. Keen; Howard M. Flournoy

[57] ABSTRACT

Additives which improve the low-temperature properties of distillate fuels are the oligomeric/polymeric reaction products of one or more bicyclic or alkyl anhydrides or their diacid equivalents and one or more long-chain epoxides or their corresponding acid/diol equivalents, with optional termonomers.

23 Claims, No Drawings

OLIGOMERIC/POLYMERIC MULTIFUNCTIONAL ADDITIVES TO IMPROVE THE LOW-TEMPERATURE PROPERTIES OF DISTILLATE FUELS

CROSS-REFERENCE TO RELATED APPLICATIONS

This application is related to application Ser. No. 07/620,799, filed Dec. 3, 1990 now U.S. Pat. No. 5,129,917.

BACKGROUND OF THE INVENTION

1. Field of the Invention

This application is directed to oligomeric/polymeric multifunctional additives prepared from various combinations of bicyclic anhydrides, alkyl anhydrides and long-chain epoxides and mixtures thereof and post reaction products thereof which are useful in improving the low-temperature properties of distillate fuels and to fuel compositions containing same.

2. Description of Related Art

Traditionally, the low-temperature properties of distillate fuels have been improved by the addition of kerosene, sometimes in very large amounts (5-70 wt %). The kerosene dilutes the wax in the fuel, i.e., lowers the overall weight fraction of wax, and thereby lowers the cloud point, filterability temperature, and pour point simultaneously. The additives of this invention effectively lower both the cloud point and CFPP (Cold Filter Plugging Point) of distillate fuel without any appreciable dilution of the wax component of the fuel.

Other additives known in the art have been used in lieu of kerosene to improve the low-temperature properties of distillate fuels. Many such additives are polyolefin materials with pendent fatty hydrocarbon groups. These additives are limited in their range of activity; however, most improve fuel properties by lowering the pour point and/or filterability temperature. These same additives have little or no effect on the cloud point of the fuel. The additives of this invention effectively lower distillate fuel cloud point, and thus provide improved low-temperature fuel properties, and offer a unique and useful advantage over known distillate fuel additives. No art is known to applicants which teaches or suggests the additive products and compositions of this invention.

BRIEF SUMMARY OF THE INVENTION

Novel polyester and modified polyester polymers or oligomers have been prepared comprising cooligomers/copolymers prepared from (1) bicyclic anhydrides or diacid equivalents and long-chain (at least about $C_{12}$) epoxides or diol equivalents and from (2) alkyl anhydrides or diacid equivalents and long-chain epoxides or diol equivalents and (3) post reaction products thereof which have been found to be surprisingly active wax crystal modifier additives for distillate fuels. Distillate fuel compositions containing $\leq 0.1$ wt % of such additives demonstrate significantly improved low-temperature flow properties, i.e., lower cloud point and lower CFPP filterability temperature.

These additives are oligomeric and/or polymeric ester products which have linear hydrocarbyl pendant groups attached to the backbone of the oligomeric/polymeric structure. These esters are derived from the polymerization of a suitable combination of monomers which include (1) one or more epoxides, (2) one or more anhydrides, and optionally (3) a reactive material, e.g. isocyanates, diisocyanates, epoxy halides, carbamates, diepoxides, dianhydrides, polyols, etc., which may function as a chain transfer agent, chain terminator, chain propagator, or chain cross-linking agent. Alternatively, condensation reaction with removal of water or other such by-product may be employed to make the same oligomeric/polymeric esters from a monomer mixture which may include (1) one or more diols, (2) one or more diacid equivalents (anhydride, diacid, diacid chloride, etc.), and optionally (3) the same reactive materials listed above.

Additionally, the oligomeric and/or polymeric ester products, derived as described above, may be further reacted with additional reagents in a second synthetic step so as to derivatize, cap, or otherwise modify reactive end groups or other pendant groups incorporated along the backbone of the original oligomeric/polymeric ester. These additional reagents may include, for example, amines or alcohols which would serve to convert residual acids and anhydrides in the oligomeric/polymeric ester product to alternate carboxyl derivatives such as amides, imides, salts, esters, etc. Similarly, residual epoxides would be converted to amine and ether adducts. These examples serve to illustrate, but not limit, the concept of post-reacting the original oligomeric/polymeric ester product to modify its original chemical functionality.

These oligomeric/polymeric esters are structurally very different from the known categories of polymeric wax crystal modifiers. Known polymeric wax crystal modifiers are generally radical-chain reaction products of olefin monomers, with the resulting polymer having an all-carbon backbone. The materials of this invention are condensation products of epoxides (or diols) and anhydrides (or acid equivalents) to give polymeric structures where ester functions are regularly spaced along the polymer backbone.

These new additives are especially effective in lowering the cloud point of distillate fuels, and thus improve the low-temperature flow properties of such fuels without the use of any light hydrocarbon diluent, such as kerosene. In addition, the filterability properties are improved as demonstrated by lower CFPP temperatures. Thus, the additives of this invention demonstrate multifunctional activity in distillate fuels.

The compositions of these additives are unique. Also, the additive concentrates and fuel compositions containing such additives are unique. Similarly, the processes for making these additives, additive concentrates, and fuel compositions are unique.

The primary object of this invention is to improve the low-temperature flow properties of distillate fuels. These new additives are especially effective in lowering the cloud point of distillate fuels, and thus improve the low-temperature flow properties of such fuels without the use of any light hydrocarbon diluent, such as kerosene. In addition, the filterability properties are improved as demonstrated by lower CFPP temperatures. Thus, the additives of this invention demonstrate multifunctional activity in distillate fuels.

DESCRIPTION OF THE PREFERRED EMBODIMENTS

The additives of this invention have comb-like structures, where a critical number of linear hydrocarbyl groups are attached to the backbone of an oligomeric/- polymeric polyester. These additives are reaction products obtained by combining two, or optionally more, monomers in differing ratios using standard techniques for condensation polymerization. These wax crystal modifiers which are effective in lowering cloud point are generally characterized as alternating co-oligomers/copolymers (or optionally terpolymers, etc.) of the following type:

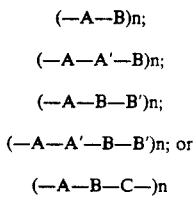

where n is equal to or greater than 1, A or A' is one or more anhydrides or diacid equivalents, B or B' is one or more epoxides or diol equivalents and C is said reactive material.

One combination of monomers may include (A) one or more anhydrides, (B) one or more epoxides, and optionally (C) a reactive material, e.g. isocyanate, diisocyanate, epoxy halide, diepoxide, dianhydride, polyol, etc., which may function as a chain transfer agent, chain terminator, chain propagator, or chain cross-linking agent. Alternatively, a second combination of monomers, in which the removal of a low molecular weight by-product accompanies the condensation reaction, may include (A) one or more diacid equivalents (anhydride, diacid, diacid chloride, etc.), (B) one or more diols, and optionally (C) the same reactive materials listed above. Comonomer stoichiometry may vary widely with A:B=1:2 to 2:1, or preferably A:B=1:1.5 to 1.5:1, or most preferably A:B=1:1.1 to 1.1:1. Optional termonomers, component C, may substitute for some fraction of A or B in the above stoichiometric ranges.

The pendant linear hydrocarbyl groups are carried by at least one, and optionally by more than one, of the monomers. These critical linear pendant hydrocarbyl groups are generally $C_{12}$ or longer. Hydrocarbyl in accordance with the invention includes alkyl, alkenyl, aryl, alkaryl, aralkyl and optionally may be cyclic or polycyclic.

Additives of this invention may be grouped into categories based on distinct structural and compositional differences, described below. Preparation of selected additives are given in EXAMPLES 1-3. Additive compositions and their respective performance for cloud point and CFPP are given in TABLE 1.

Category A: Bicyclic Anhydride (TABLE 1)

Successful additives may be AB-type co-oligomers/copolymers which are prepared from bicyclic anhydrides (A comonomer) and long-chain (at least about $C_{12}$) epoxides (B comonomer) using an amine catalyst. The bicyclic anhydrides are structurally very different from other anhydrides such as aromatic anhydrides, and they provide wax crystal modifiers with unexpectedly good performance. For example, methylnorbornene dicarboxylic anhydride (AC-Methyl) can be used to prepare a surprisingly effective wax crystal modifier (see Entries 30-32). Again, stoichiometries of anhydride/epoxide may vary over a large range, e.g. 2/1 to ½, as indicated above. The non-aromatic character of the materials in this category will have different, and potentially advantageous, solubility advantages in a variety of hydrocarbon fluids.

A typical synthesis is illustrated by the preparation of the co-oligomer/copolymer Entry 30 in EXAMPLE 1.

Category B: Alkyl Anhydride (TABLE 1)

Successful additives may be AB-type co-oligomer/copolymers which are prepared from surprisingly simple alkyl anhydrides (A comonomer) and long-chain epoxides (B comonomer) using an amine catalyst. These alkyl anhydrides may include alicyclic anhydrides, e.g. tetrahydrophthalic anhydride, Entry 33, succinic anhydride, e.g. Entry 34, and alkylated succinic anhydrides, e.g. $C_{18}$–$C_{24}$ alkylated succinic anhydride; Entries 35-39 and 41-46. Maleic anhydride may also be included but the synthesis requires that the other comonomer be a diol, e.g. Vikinol 18, Entry 40, in a conventional condensation reaction. Amine-catalyzed polymerization of maleic anhydride/epoxide mixture gives intractable cross-linked polymer gels, otherwise. As indicated above, more than one epoxide may be used in the synthesis of the additive; for example, epoxide mixtures may include mixed long-chain epoxides, e.g. linear $C_{14}$–$C_{20}$ epoxides, Entries 43-44, glycidyl ethers, e.g. Araldite DY 023, Entries 41-42, and epoxidized fatty ester, e.g. Vikoflex 7010, Entries 45-46. In addition, mixed anhydrides may be used, for example, Entries 41-46, 36-39.

A typical synthesis is illustrated by the preparation of the co-oligomer/copolymer Entry 37 in EXAMPLE 2.

Category C: Post-Reacted Oligomeric/Polymeric Esters (TABLE 1)

As a further extension of the additives derived in category D, above, reactive oligomers/polymers may be post-reacted with suitable reagents in order to introduce other desirable functionality. Maleate oligomers/polymers (Entry 40) are examples in which post-reaction derivatization can be beneficial. For example, after addition of a secondary amine to the original cooligomer/copolyer product, the post-reacted additives (Entries 47-48) possess even better cloud point and CFPP activities than the original (Entry 40).

A typical synthesis is illustrated by the preparation of the post-reacted co-oligomer/copolymer Entry 47 in EXAMPLE 3. Suitable post reactants include any reactive amine or alcohol.

Generally speaking, R, $R_1$, $R_2$, etc. as defined above may vary from $C_1$ to about $C_{300}$.

The reactions can be carried out under widely varying conditions which are not believed to be critical. The reaction temperatures can vary from about 100° to 225° C., preferably 120° to 180° C., under ambient or autogenous pressure. However, slightly higher pressures may be used if desired. The temperatures chosen will depend upon for the most part on the particular reactants and on whether or not a solvent is used. A solvent may or may not be used. Solvents, if used, will typically be hydrocarbon solvents such as xylene, but any non-polar, unreactive solvent can be used including benzene and toluene and/or mixtures thereof.

Molar ratios, less than molar ratios or more than molar ratios of the reactants can be used.

The times for the reactions are also not believed to be critical. The process is generally carried out in from about one to twenty-four hours or more.

In general, the reaction products of the present invention may be employed in any amount effective for imparting the desired degree of activity to improve the low temperature characteristics of distillate fuels. In many applications the products are effectively employed in amounts from about 0.001% to about 10% by weight and preferably from less than 0.01% to about 5% of the total weight of the composition.

These additives may be used in conjunction with other known low-temperature fuel additives (dispersants, etc.) being used for their intended purpose.

The fuels contemplated are liquid hydrocarbon combustion fuels, including the distillate fuels and fuel oils. Accordingly, the fuel oils that may be improved in accordance with the present invention are hydrocarbon fractions having an initial boiling point of at least about 250° F. and an end-boiling point no higher than about 750° F. and boiling substantially continuously throughout their distillation range. Such fuel oils are generally known as distillate fuel oils. It is to be understood, however, that this term is not restricted to straight run distillate fractions. The distillate fuel oils can be straight run distillate fuel oils, catalytically or thermally cracked (including hydrocracked) distillate fuel oils, or mixtures of straight run distillate fuel oils, naphthas and the like, with cracked distillate stocks. Moreover, such fuel oils can be treated in accordance with well-known commercial methods, such as, acid or caustic treatment, hydrogenation, solvent refining, clay treatment, etc.

The distillate fuel oils are characterized by their relatively low viscosities, pour points, and the like. The principal property which characterizes the contemplated hydrocarbons, however, is the distillation range. As mentioned hereinbefore, this range will lie between about 250° F. and about 750° F. Obviously, the distillation range of each individual fuel oil will cover a narrower boiling range falling, nevertheless, within the above-specified limits. Likewise, each fuel oil will boil substantially continuously throughout its distillation range.

Contemplated among the fuel oils are Nos. 1, 2 and 3 fuel oils used in heating and as diesel fuel oils, and the jet combustion fuels. The domestic fuel oils generally conform to the specification set forth in A.S.T.M. Specifications D396-48T. Specifications for diesel fuels are defined in A.S.T.M. Specification D975-48T. Typical jet fuels are defined in Military Specification MIL-F-5624B.

In general, the reaction products of the present invention may be employed in any amount effective for imparting the desired degree of activity to improve the low temperature characteristics of distillate fuels. In many applications the products are effectively employed in amounts from about 0.001% to about 10% by weight and preferably from less than 0.01% to about 5% of the total weight of the composition.

The following examples are illustrative only and are not intended to limit the scope of the invention.

EXAMPLE 1

Preparation of Additive Entry 30

Methylnorbornene dicarboxylic anhydride (32.4 g, 0.182 mol; e.g. AC-Methyl from Anhydrides and Chemicals, Inc.), 1,2-epoxyoctadecane (53.7 g, 0.20 mol; e.g. Vikolox 18 from Viking Chemical), and 4-dimethylaminopyridine (0.09 g, 0.0007 mol; e.g. DMAP from Nepera, Inc.) were combined and heated at 100°–120° C. for 24 hours. The reaction mixture was then hot filtered through a mixed bed of alumina (approximately 20%) and Celite to give 68.0 g of the final product.

EXAMPLE 2

Preparation of Additive Entry 37

$C_{18}$–$C_{24}$ Alkyl succinic anhydride (65.6 g, 0.13 mol), 1,2-epoxyoctadecane (57.0 g, 0.13 mol; e.g. Vikolox 18 from Viking Chemical), and 4-dimethylaminopyridine (0.10 g, 0.0007 mol; e.g. DMAP from Nepera, Inc.) were combined and heated at 140° C. for 23 hours. The reaction mixture was then hot filtered through a mixed bed of alumina (approximately 20%) and Celite to give 96.5 g of the final product.

EXAMPLE 3

Preparation of Additive Entry 47

Maleic anhydride (14.0 g, 0.143 mol; e.g. from Aldrich Chemical Co.), 1,2-octadecanediol (43.0 g, 0.15 mol; e.g. Vikinol 18 from Viking Chemical), and xylene (60 cc) were combined and heated at 160° C. Di(hydrogenated tallow) amine 35.7 g, 0.0714 mol; e.g. Armeen 2HT from Akzo Chemie) was then added, and the mixture was heated at 115° C./57 hours. The reaction mixture was then hot filtered through Celite to give 77.1 g of the final product.

PREPARATION OF ADDITIVE CONCENTRATE

A concentrate solution of 100 ml total volume was prepared by dissolving 10 g of additive in mixed xylenes solvent. Any isoluble particulates in the additive concentrate were removed by filtration before use.

| TEST FUELS | | |
|---|---|---|
| Two test fuels were used for the screening of additive activity: | | |
| FUEL A: | | |
| API Gravity | 34.1 | |
| Cloud Point (°F.) | 23.4 | |
| CFPP (°F.) | 16 | |
| Pour Point (°F.) | 0 | |
| Distillation (°F; D 86) | IBP | 319 |
| | 10% | 414 |
| | 50% | 514 |
| | 90% | 628 |
| | FBP | 689 |
| FUEL B: | | |
| API Gravity | 31.5 | |
| Cloud Point (°F.) | 21.4 | |
| CFPP (°F.) | 14 | |
| Pour Point (°F.) | 10 | |
| Distillation (°F; D 86) | IBP | 340 |
| | 10% | 439 |
| | 50% | 534 |
| | 90% | 640 |
| | FBP | 693 |

TEST PROCEDURES

The cloud point of the additized distillate fuel was determined using an automatic cloud point test based on the commercially available Herzog cloud point tester; test cooling rate is approximately 1° C./minute. Results of this test protocol correlate well with ASTM D2500 methods. The test designation (below) is "HERZOG".

The low-temperature filterability was determined using the Cold Filter Plugging Point (CFPP) test. This test procedure is described in "Journal of the Institute of Petroleum", Volume 52, Number 510, June 1966, pp. 173-185.

Test results are recorded in Tables 1-10.

The products of this invention represent a significant new generation of wax crystal modifier additives which are dramatically more effective than may previously known additives. They represent a viable alternative to the use of kerosene in improving diesel fuel low-temperature performance.

TABLE 1

CATEGORIES A, B and C: COMPOSITIONS AND PERFORMANCE IN DIESEL FUEL

| ENTRY | EXPOXIDE (or DIOL)/ANHYDRIDE (or DIACID) | MOLE RATIO | PERFORMANCE IMPROVEMENT (F): CLOUD POINT (HERZOG) | CFPP |
|---|---|---|---|---|
| | CATEGORY A: "BICYCLIC ANHYDRIDE" | | | |
| | FUEL A; 1000 ppm ADDITIVE | | | |
| 30 | Vikolox 18/AC-Methyl | 1.1/1 | 7.4 | 2 |
| 31 | Vikolox 18/AC-Methyl | 1/1 | 5.2 | 2 |
| 32 | Vikolox 18/AC-Methyl | 1.25/1 | 5.9 | 2 |
| | CATEGORY B: "ALKYL ANHYDRIDES" | | | |
| | FUEL A; 1000 ppm ADDITIVE | | | |
| 33 | Vikolox 18/Tetrahydro-Phthalic Anhy | 1.1/1 | 4 | 0 |
| 34 | Vikolox 18/Succinic Anhy | 1.1/1 | 6.3 | 7 |
| 35 | Vikolox 18/$C_{12}$ Succinic Anhy | 1.1/1 | 5.2 | 0 |
| 36 | Vikolox 18/$C_{18-24}$ Succinic Anhy | 1.1/1 | 8.6 | 6 |
| 37 | Vikolox 18/$C_{18-24}$ Succinic Anhy | 1/1 | 6.5 | 4 |
| 38 | Vikolox 18/$C_{18-24}$ Succinic Anhy | 1/1.25 | 4.8 | 4 |
| 39 | Vikolox 18/$C_{18-24}$ Succinic Anhy | 1.4/1 | 5.9 | 4 |
| 40 | Vikinol 18/Maleic Anhy | 1.05/1 | 6.7 | 4 |
| | FUEL B; 1000 ppm ADDITIVE | | | |
| 41 | Vikolox 18/Araldite DY 023/$C_{18-24}$ Succinic Anhy | 0.9/0.1/1 | 4.7 | 4 |
| 42 | Vikolox 19/Araldite DY 023/$C_{18-24}$ Succinic Anhy | 0.75/0.25/1 | 3.9 | 4 |
| 43 | Vikolox 18/Vikolox 14-20/$C_{18-24}$ Succinic Anhy | 0.5/0.5/1 | 3.9 | 4 |
| 44 | Vikolox 14-20/$C_{18-24}$ Succinic Anhy | 1/1 | 3.6 | 4 |
| | FUEL B; 500 ppm ADDITIVE | | | |
| 45 | Vikolox 18/Vikoflex 7010/$C_{18-24}$ Succinic Anhy | 0.95/0.05/1 | 3.2 | 4 |
| 46 | Vikolox 18/Vikoflex 7010/$C_{18-24}$ Succinic Anhy | 0.9/0.1/1 | 2.9 | 2 |
| | CATEGORY C: POST-REACTED "ALKYL ANHYDRIDE" POLYESTERS | | | |
| | FUEL A; 1000 ppm ADDITIVE | | | |
| 47 | Vikinol 18/Maleic Anhy/Armeen 2HT | 1.05/1/0.5 | 7.7 | 7 |
| 48 | Vikinol 18/maleic Anhy/Armeen 2HT | 1.05/1/0.95 | 7.2 | 6 |

Although the present invention has been described with preferred embodiments, it is to be understood that modifications and variations may be resorted to, without departing from the spirit and scope of this invention, as those skilled in the art will readily understand. Such variations and modifications are considered within the purview and scope of the appended claims.

APPENDIX 1. GLOSSARY

| | |
|---|---|
| AC-Methyl: | 1-methyl-5-norbornene-2,3-dicarboxylic anhydride |
| Armeen 2HT: | di(hydrogenated tallow) amine |
| Araldite DY 023: | cresol glycidyl ether |
| CFPP: | cold filter plugging point |
| Herzog: | cloud point test; Herzog method |
| Phthalic anhydride: | 1,2-benzenedicarboxylic anhydride |
| Vikolox 7010: | epoxidized methyl soyate |
| Vikolox "N": | Linear 1,2-epoxyalkane, where N = the carbon number of the alkyl chain; N = 12, 14, 16, 18, 20, 20-24, 24-28, 30+. |

We claim:

1. A multifunctional low-temperature-modifying distillate fuel additive consisting of a polymeric and/or oligomeric ester additive product of reaction prepared by polymerizing or oligomerizing a suitable combination of monomers selected from the group consisting of (1) one or more long-chain epoxides or diol equivalents (2) one or more bicyclic or alkyl anhydrides or diacid equivalents, or mixtures of (1) and (2), and (3) optionally a suitable reactive material selected from the group consisting of isocyanates, diisocyanates, epoxy halides, carbamates, diepoxides, dianhydrides or polyols, in varying molar ratios under suitable conditions of time, temperature and pressure and wherein the molar ratios of reactants vary from equimolar to more than molar to less than molar, at temperatures varying from about 50° to about 250° C. and with pressures varying from atmospheric to slightly higher for times varying from about an hour to 48 hours or more thereby producing the desired ester additive products said products containing polymeric structures having ester functions and long-chain hydrocarbyl groups independently and regularly spaced along the polymer backbone and wherein hydrocarbyl is selected from the group consisting of alkyl, alkenyl, aryl, alkaryl, aralkyl, which may be cyclic or polycyclic and wherein said ester additive product is (4) optionally post reacted with suitable reactive amines, alcohols or a mixture of such amines and alcohols.

2. The ester additive product of reaction of claim 1 wherein said additive is prepared from monomers selected from the group consisting of (1) bicyclic or alkyl anhydrides and long-chain epoxide comonomers, (2) mixed long chain epoxides and bicyclic or alkyl anhydrides comonomers, (3) mixed bicyclic or alkyl anhydrides and epoxide comonomers and/or is (4) a post reacted oligomeric/polymeric ester of said bicyclic or alkyl anhydrides and reactive amines or alcohols.

3. The ester additive products of reaction of claim 2 wherein the additive products of reaction described therein as prepared from (1) bicyclic or alkyl anhydrides and epoxides comonomers selected from 1,2-epoxyoctadecane and 1-methyl-5-norbornene-2,3-dicarboxylic anhydride; 1,2-epoxyoctadecane and tetrahydro-phthalic anhydride; 1,2-epoxyoctadecane and succinic anhydride or C12 succinic anhydride or C18-C24 succinic anhydride; 1,2-epoxyoctadecane and maleic anhydride or, (2) mixed epoxides and bicyclic or alkyl anhydrides comonomers selected from 1,2-epoxyoctadecane plus cresol diglycidyl ether and C18-C24 succinic anhydride; 1,2-epoxyoctadecane plus 1,2-epoxyalkane($C_{14}$–$C_{20}$) and $C_{18}$ to C24 succinic anhydride; and 1,2-epoxyalkane($C_{14}$ to $C_{20}$) and $C_{18}$ to $C_{24}$ succinic anhydride and, (3) mixed bicyclic or alkyl anhydrides and epoxides comonomers selected from 1,2-epoxyoctadecane plus epopxidized methyl soyate and $C_{18}$ to $C_{24}$ succinic anhydride or (4) are post reacted oligomeric or polymeric esters are selected from 1,2-epoxyoctadecane, maleic anhydride and di(hydrogenated tallow) amine.

4. The additive product of claim 1 wherein at least one of said monomers and optionally more than one, has a pendant hydrocarbyl group of at least $C_{12}$ or longer.

5. The additive product of claim 1 wherein the monomers are methylnorborene dicarboxylic anhydride and 1,2-epoxyoctadecane.

6. The additive product of claim 1 wherein the monomers are $C_{18}$–$C_{24}$ alkyl succinic anhydride and 1,2-epoxyoctadecane.

7. The additive product of claim 1 wherein the monomers are maleic anhydride, and 1,2-octanediol and di(hydrogenated tallow)amine.

8. A process of preparing a multifunctional low-temperature modifying distillate fuel polymeric and/or oligomeric ester product of reaction comprising polymerizing or oligomerizing a suitable combination of monomers selected from the group consisting of (1) one or more long-chain epoxides or diol equivalents (2) one or more bicyclic or alkyl anhydrides or diacid equivalents or mixtures of (1) and (2), and (3) optionally a reactive material selected from the group consisting of isocyanates, diisocyanates, epoxy halides, carbamates, diepoxides, dianhydrides or polyols, in varying molar ratios under suitable conditions of time, temperature and pressure and wherein the molar ratios of reactants vary from equimolar to more than molar to less than molar, at temperatures varying from about 50° to about 250° C. and with pressure varying from atmospheric to slightly higher for times varying from about an hour to 48 hours or more thereby producing the desired ester additive product said product containing polymeric structures having ester functions having long-chain hydrocarbyl groups independently and regularly spaced along the polymer backbone and wherein hydrocarbyl is selected from the group consisting of alkyl, alkenyl, aryl, aralkyl, alkaryl, which may be cyclic or polycyclic and wherein said ester additive product of reaction is (4) optionally post reacted with a suitable reagent selected from suitable reactive amines and alcohols or mixtures of such amines and alcohols.

9. The process of claim 8 wherein at least one of said monomers and optionally more than one, has a pendant hydrocarbyl group of at least $C_{12}$ or longer.

10. The process of claim 8 wherein the monomers are methylnorborene dicarboxylic anhydride and 1,2-epoxyoctadecane.

11. The process of claim 8 wherein the monomers are $C_{18}$–$C_{24}$ alkyl succinic anhydride and 1,2-epoxyoctadecane.

12. The process of claim 8 wherein the monomers are maleic anhydride, 1, 2-octadecanediol and di(hydrogenated tallow) amine.

13. A fuel additive concentrate comprising a suitable major amount of a liquid hydrocarbon solvent having dissolved therein a minor effective amount of a low-temperature modifying fuel additive product of reaction as claimed in claim 1.

14. The fuel additive concentrate of claim 13 having a total volume of about 100 ml, and having about 10 g of said additive product of reaction dissolved therein.

15. The fuel additive concentrate of claim 13 wherein said solvent is selected from the group consisting of xylene, mixed xylenes and toluene.

16. A liquid hydrocarbyl fuel composition comprising a major amount of said fuel an a minor amount of a multifunctional low-temperature modifying distillate fuel polymeric and/or oligomeric ester additive product of reaction prepared by polymerizing or oligomerizing a suitable combination of monomers selected from the group consisting of (1) one or more long-chain epoxides or diol equivalents, (2) one or more bicyclic or alkyl anhydrides or diacid equivalents, or mixtures of (1) and (2), and (3) optionally a suitable reactive material selected from the group consisting of isocyanates, diisocyanates, epoxy halides, carbamates, diepoxides, dianhydrides or polyols, in varying molar ratios under suitable conditions of time, temperature and pressure and wherein the molar ratios of reactants vary from equimolar to more than molar to less than molar, at temperatures varying from about 50° to about 250° C. and with pressures varying from atmospheric to slightly higher for times varying from about an hour to 48 hours or more thereby producing the desired ester additive product said product containing polymeric structures having ester functions and long-chain hydrocarbyl groups independently and regularly spaced along the polymer backbone and wherein hydrocarbyl is selected from the group consisting of alkyl, alkenyl, aryl, alkaryl, aralkyl and my be cyclic or polycyclic and wherein said ester additive product of reaction is (4) post reacted with a suitable reagent selected from suitable suitable amines and alcohols or a mixture of such amines and alcohols.

17. The fuel composition of claim 16 wherein the additive product of reaction is prepared from monomers selected from the group consisting of (1) bicyclic anhydrides and long-chain epoxides as comonomers, (2) long-chain epoxides and alkyl anhydrides as comonomers, and (3) post reacted oligomeric or polymeric esters.

18. The fuel composition of claim 16 wherein the additive products of reaction described therein as prepared from (1) bicyclic or alkyl anhydrides and long-chain epoxide comonomers selected from 1,2-epoxyoctadecane and 1-methyl-5-norbornene-2,3-dicarboxylic anhydride; 1,2-epoxyoctadecane and tetrahydrophthalic anhydride; 1,2-epoxyoctadecane and succinic anhydride or C12 succinic anhydride or C18-C24 succinic anhydride; 1,2-epoxyoctadecane and maleic anhydride, (2) mixed long-chain epoxides and bicyclic or alkyl anhydride comonomers selected from 1,2-epoxyoctadecane plus cresol diglycidyl ether and C18-C24 succinic anhydride; 1,2-epoxyoctadecane plus 1,2-epoxyalkane($C_{14}$–$C_{20}$) and $C_{18}$ to C24 succinic anhydride; and 1,2-epoxyalkane($C_{14}$ to $C_{20}$) and $C_{18}$ to $C_{24}$ succinic anhydride and, (3) mixed bicyclic orr alkyl anhydrides and epoxide comonomers or (4) are post reacted oligomeric or polymeric esters selected from 1,2-epoxyoctadecane, maleic anhydride and di(hydrogenated tallow) amine.

19. The fuel composition of claim 16 wherein at least one of said monomers and optionally more than one, has a pendant hydrocarbyl group of at least $C_{12}$ or longer.

20. The fuel composition of claim 16 wherein the monomers are methylnorborene anhydride and 1,2-epoxyoctadecane.

21. The fuel composition of claim 16 wherein the monomers are $C_{18}$–$C_{24}$ phthalic anhydride and 1,2-octadecane.

22. The fuel composition of claim 16 wherein the monomers are maleic anhydride, 1,2-octadecanediol and di(hydrogenated tallow) amine.

23. The fuel composition of claim 16 comprising from about 0.001 to about 10% by weight based on the total weight of the composition of the additive product of reaction.

* * * * *